INVENTOR
KIYOSHI INOUE 3,409,753
SATURABLE REACTOR TYPE CONTROL SYSTEM FOR ELECTRICAL DISCHARGE MACHINING APPARATUS
Kiyoshi Inoue, 182 Yoga Tamagawa, Setagaya-ku, Tokyo, Japan
Filed Oct. 5, 1964, Ser. No. 401,308
4 Claims. (Cl. 219—69)

ABSTRACT OF THE DISCLOSURE

Current control circuit for controlling electrical discharge machining current level responsive to open circuit or short circuit gap condition. Said circuit comprises: a three-phase source of alternating current potential; a full-wave rectifier connecting each source phase to the gap; a saturable reactor in series with each phase lead; a control winding having in series separate portions, one cooperable with each saturable reactor; and an energizing circuit for the control winding comprising an additional rectifier connected across said winding, and a capacitor and a variable resistor connected in series with the additional rectifier and across the gap.

---

In electrical discharge machining, a conductive workpiece is machined by an electrode tool by means of passage of machining pulses across a gap between the electrode and the workpiece in the presence of a dielectric coolant. In order to decrease the current to the gap upon a short circuit condition, a suitable current control device—for example, a saturable reactor—may be connected between the machining pulse source and the machining gap. During normal machining conditions, the saturable reactor remains strongly saturated to maintain its impedance at its lowest level. The saturation should be diminished only when the short circuit condition occurs, thus causing high impedance and controlling the current supplied to the gap during the short circuit condition to prevent damage to the electrode or workpiece. A servo feed system is customarily utilized to advance the electrode during machining to provide a predetermined gap spacing between electrode and workpiece during machining and, in the event of a short circuit condition, to retract the electrode from the workpiece to restore the normal gap spacing and to reinitiate normal machining pulses. In the operation of any servo feed system whether it responds to average gap voltage, gap current or any other parameter of the gap, there is a substantial delay before the retraction of the electrode occurs to effectually eliminate the short circuit condition by widening of the gap.

It is a principal object of this invention to provide a current control circuit for an electrical discharge machining power supply in which the current limiting device is operable to limit current flow to the gap in the open circuit condition when the electrode is being downfed initially or subsequently to short circuit and in the short circuit condition of the gap.

It is a further object of this invention to provide a current control circuit for an electrical discharge machining power supply which is effective almost immediately upon the occurrence of a short circuit condition thus to limit the current available to the gap in a time period substantially shorter than the condition could be remedied by the action of the servo feed.

It is an additional object of this invention to provide a current control circuit for an electrical discharge machining power supply which in response to short circuit or open circuit condition of the gap inhibits current flow to the gap and which in response to passage of acceptable machining pulses permits normal current flow to the gap.

Other objects and advantages will become apparent from the following specification which, in conjunction with the accompanying drawings, discloses a preferred form of the invention.

Figure 1:
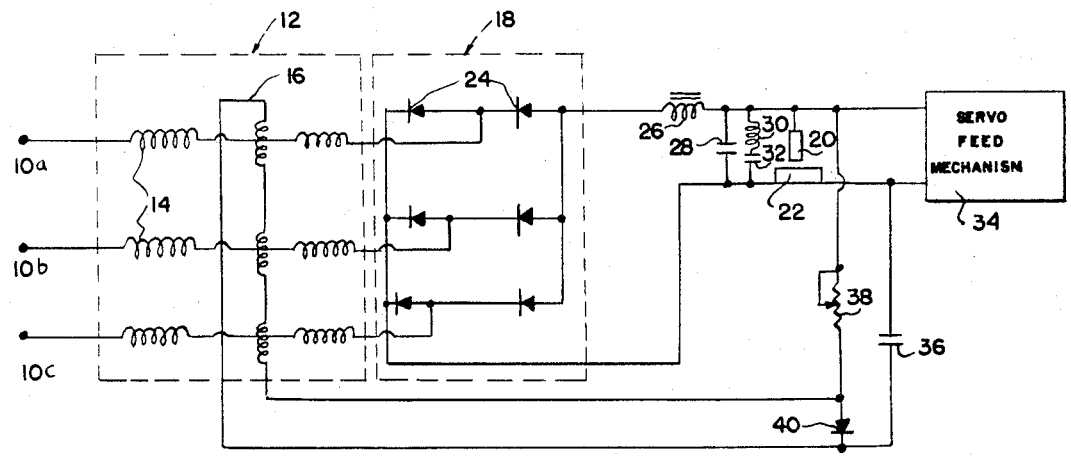
Figure 2:
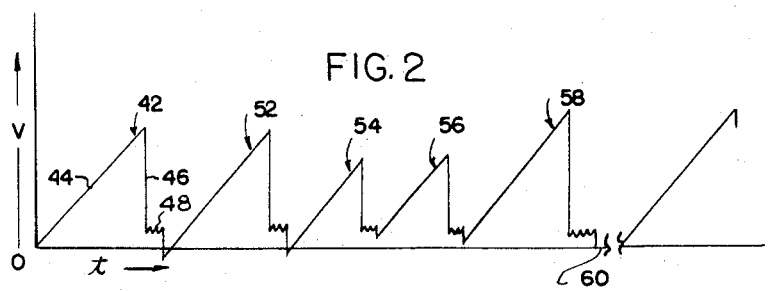
Figure 3:
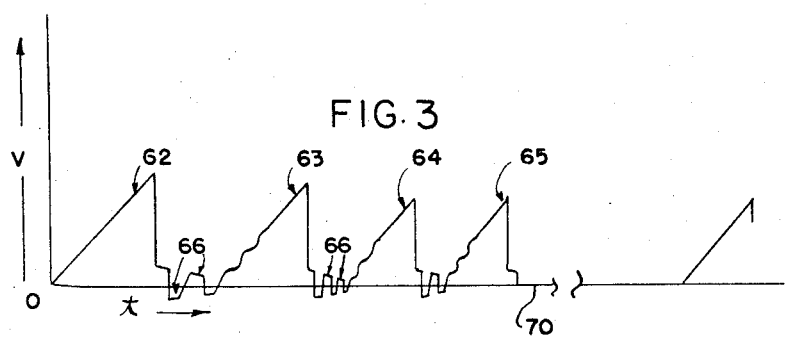

FIGURE 1 is a schematic drawing of the electrical discharge machining power supply and current control circuit; and FIGURES 2 and 3 are voltage waveform diagrams illustrating the mode of operation of the circuit of FIGURE 1.

With more specific reference to the details of the apparatus as shown by FIGURE 1, an alternating current input is received at terminals 10a, b and c. While the input is indicated as that of three-phase alternating current, it will be understood that the invention is not so limited and may, if desired, utilize a source of alternate current potential having any desired number of phases. A current control device is utilized in the form of saturable reactor means 12 which has its AC windings 14 in series with the several AC inputs and its DC control winding 16 operable to control the degree of saturation in response to current flow therethrough, in a manner which is well known in the art. By saturable reactor means, I mean a device in which a saturable reactor is included in series with each input lead from the AC source. A rectifier means 18 is connected between saturable reactor 12 and the gap. By rectifier means, I mean a half-wave or full-wave rectifier comprising one or more unilateral current conducting devices of the semiconductor or electron tube type. The machining gap, as has previously been indicated, comprises an electrode tool 20 and a workpiece 22 which are normally separated by a dielectric fluid. The conventional polarity of the EDM machining gap is shown in which the electrode 20 is negative and the workpiece 22 is positive. However, the opposite polarity may be employed, if desired, by simple reversal of the polarity of the gap elements. While the components of full-wave rectifier 18 are indicated as semiconductor diodes 24, it will be understood that any type of rectifier such as an electron tube rectifier may be utilized in their place. To provide machining pulses across the gap, a gap capacitor 28 is connected in parallel with the gap, which capacitor is alternately charged and discharged across the gap. An inductor 26 is connected in series with the negative terminal of rectifier 18 in the charging circuit for capacitor 28 and serves to isolate the machining gap from the capacitance inherent in the rectifier elements, so that inherent capacitance does not discharge directly before the saturable reactor control responds to reduce output current.

In addition to capacitor 28, at least one resonant LC network including inductor 30 and serially connected capacitor 32 may be connected across the gap. It is the function of the resonant LC network to provide oscillatory follow-up impulses subsequent to each of the main machining pulses in accordance with the method of electrical discharge machining which I have previously disclosed and described in my U.S. Patent No. 3,054,931, issued Sept. 18, 1962, entitled "Electrical Power Supply Apparatus for Electrical Discharge Machining." Servo feed mechanism 34 is operatively connected to the machining gap and, as has previously been mentioned, serves to maintain a predetermined optimum gap spacing and to advance and retract the electrode 20 responsive to an electrical parameter of the gap which, in turn, is a function of gap spacing. Such servo feed mechanisms are well known in the electrical discharge machining art.

The present invention is primarily concerned with the provision of an improved control circuit for saturable reactor means 12. To that end, the capacitor 36, rheostat 38, and rectifier 40 are connected in series across the gap in the manner illustrated in FIGURE 1. It should be noted that rectifier 40 is connected in shunt with the input leads for the serially connected control winding 16.

DESCRIPTION OF OPERATION

The description of operation will now be made with particular reference to the voltage waveforms of FIGURES 2 and 3. The action of servo mechanism 34 is initiated to advance electrode 20 toward the workpiece 22 to establish the optimum gap spacing at which machining pulses will cause dielectric breakdown and pass across the gap. Additionally, an AC power input to terminals 10a, b and c is provided. During the open circuit condition, as the electrode 20 approaches the workpiece 22, an instantaneous charge will be communicated through control windings 16 to capacitor 36 with the upper plate of that capacitor being charged positively and the lower plate being charged negatively. As the first discharge of gap capacitors 28 and 32 occurs, the gap voltage will fall below the voltage charge previously established on capacitor 36. FIGURE 2 illustrates the mode of operation of the circuit of FIGURE 1 in which the resonant LC network comprising inductor 30 and capacitor 32 has been omitted. The numeral 42 indicates the first machining pulse which crosses the gap with the capacitor 28 being charged along line 44 and discharged along the line 46. The waveform portion 48 illustrates the voltage condition at the gap during which actual cutting occurs. Wave portion 50 illustrates the reverse voltage due to inherent gap loop inductance which occurs across the gap at the end of a relatively high voltage discharge 42. Additional machining pulses 52, 54, 56 and 58, are illustrated which are normal machining pulses. At the end of pulse 58, a short circuit condition occurring across the gap is illustrated by the broken line 60. This short circuit may be caused by bridging of the gap by previously eroded particles from the workpiece 22. Prior to the occurrence of the short circuit condition illustrated by the numeral 60, the action of the saturable reactor control circuit has been such as to maintain a current flow through control winding 16 and to therefore maintain the impedance of saturable reactor 12 at a minimum and to provide free flow of machining current to the gap. This flow of current to control winding 16 is as follows: Each time the voltage at the gap drops substantially with the occurrence of a machining pulse, capacitor 36 discharges through rectifier 40 as limited by the resistance of rheostat 38 causing current flow through control winding 16. Otherwise stated, control winding 16 continues to pass current and maintain the impedance of saturable reactor 12 at a relatively low value so long as normal cutting pulses are occurring. Upon occurrence of a short circuit condition as illustrated by the numeral 60, no charging voltage exists to energize control windings 16, and consequently the control current decays rapidly in windings 16. Thus, saturable reactor 12 has its impedance maintained at a maximum to inhibit flow of current to the gap until occurrence of the following normal machining pulse.

FIGURE 3 illustrates the mode of operation of the circuit of FIGURE 1 in which the resonant LC network comprising inductor 30 and capacitor 32 is incorporated. In the operation of this modification of the circuit, capacitor 28 is periodically charged and discharged to form the main machining pulses illustrated in FIGURE 3 and identified by the numerals 62, 63, 64, 65. Each of the main machining pulses is followed by a series of follow-up oscillatory pulses occurring across the gap as identified by the numerals 66, 68. During the occurrence of pulses 62, 63, 64, 65, and the follow-up oscillatory pulses 66 initiated by the action of the resonant LC network, capacitor 36 is alternately charged and discharged to provide a current flow through control winding 16 in the manner previously indicated in connection with FIGURE 2, to maintain the impedance of saturable reactor 12 at a value approximating zero so that free flow of current to the machine gap is permitted. At the termination of pulse 65, a short circuit condition may occur as identified by the broken line 70. Upon occurrence of this condition, the control circuit responds as described above.

From the foregoing description of operation, it will be seen that I have provided an electrical discharge machining power supply in which an improved current control circuit is provided such that the current flow to the gap is precisely controlled to eliminate current flow to the gap during short circuit condition but without effect upon current flow to the gap so long as the machining pulses are acceptable and normal cutting pulses.

I claim:

1. An apparatus for machining a conductive workpiece across a gap between an electrode and the workpiece in the presence of a dielectric coolant, said apparatus comprising a source of alternating current potential, a first rectifier means connected to said source and having its output connected to the gap, a saturable reactor means operatively connected between said source and said first rectifier means, said saturable reactor means including a control winding, and an energizing circuit for said control winding, said energizing circuit comprising a second rectifier means connected across said winding and a capacitor connected in a series combination with said second rectifier means, said series combination being connected across the gap.

2. The apparatus set forth in claim 1 wherein said first rectifier means comprises a full-wave rectifier and said second rectifier means comprises a half-wave rectifier.

3. The apparatus set forth in claim 1, further comprising a variable resistor connected in series with said series combination across said gap.

4. In an apparatus for machining a conductive workpiece across a gap between an electrode and the workpiece in the presence of a dielectric coolant, in combination, a source of polyphase alternating current potential; a rectifier means connected to said source and having its output connected to the gap; a saturable reactor means having a respective saturable reactor in series with each phase lead of said source, control-winding means including a plurality of respective control windings of said saturable reactors connected in series, and an energizing circuit for said control-winding means comprising a second rectifier means connected across said control winding means and a capacitor and a variable resistor connected in series with said second rectifier means across the gap.

References Cited

UNITED STATES PATENTS

| | | | |
|---|---|---|---|
| 2,996,638 | 8/1961 | Webb | 219—69 X |
| 3,054,931 | 9/1962 | Inoue | 219—69 X |
| 3,089,018 | 5/1963 | Inoue | 219—69 |
| 3,257,580 | 6/1966 | Webb | 219—69 X |

RICHARD M. WOOD, *Primary Examiner.*

R. F. STAUBLY, *Assistant Examiner.*